June 16, 1964 KINICHI SHINJO 3,137,206

SPIRAL-BEVEL AND HYPOID GEAR CUTTING MACHINE

Filed Oct. 31, 1961 3 Sheets-Sheet 1

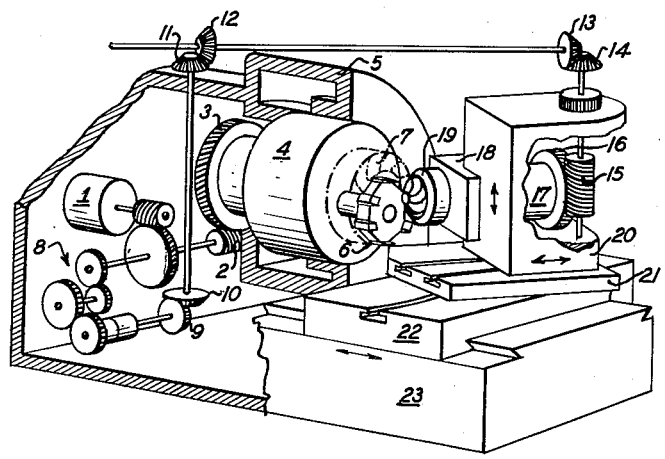
Fig. 6
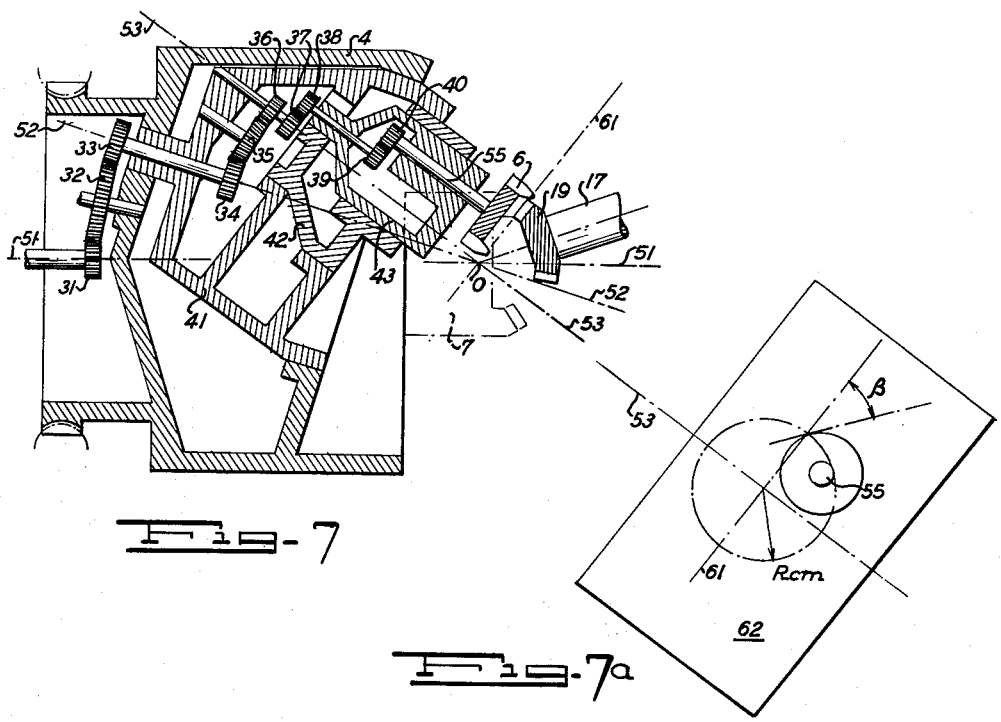
Fig. 7
Fig. 7a

United States Patent Office 3,137,206
Patented June 16, 1964

3,137,206
SPIRAL-BEVEL AND HYPOID GEAR
CUTTING MACHINE
Kinichi Shinjo, Tokyo, Japan, assignor to Toyo Haguruma
Kabushiki Kaisha, Tokyo, Japan
Filed Oct. 31, 1961, Ser. No. 148,985
Claims priority, application Japan Feb. 20, 1954
2 Claims. (Cl. 90—5)

The present invention relates to a method of cutting curved teeth on conical gear blanks and to a machine for cutting curved teeth in spiral bevel gears and hypoid gears. This application is a continuation-in-part of my earlier application, Serial Number 487,945, filed February 14, 1955, now abandoned.

There are three known types of gear cutting machines capable of cutting curved teeth, as follows:

(1) A machine which generates the gear by intermittent indexing and a face mill type annular cutter;
(2) A machine which indexes and generates the gear continuously by a taper hob; and
(3) A machine which indexes and generates the gear continuously by a face mill type hobbing cutter.

On the first machine mentioned above, the cutter represents a tooth surface of an imaginary gear which is not rotated by the cutting motion, so that independent intermittent indexing and independent generating movements are required. However, in the second and third machines mentioned above, the cutter represents tooth surfaces of an imaginary gear which is rotated by the cutting movement of the cutter so that the continuous indexing motion is simultaneously produced, and it is necessary to add only the independent generating movement.

Compared with the above mentioned machines, the gear cutting machine embodying the present invention does not require intermittent indexing, even though it employs a face mill type annular cutter. In the machine embodying this invention, the indexing motion and the generating motion result from the simple continuous rotation of a rotor carrying the cutter and the gear blank at a predetermined ratio of rotational speed. With such an arrangement, only one set of compound change gears is sufficient to control the ratio of rotational speed concerning the indexing motion and the generating motion.

This cutting method permits the use of a rotary face mill type annular cutter with a straight side cutting edge. The cutting edge of this cutter generates a conical surface by the rotary cutting motion.

The rotor installed on the gear cutting machine embodying this invention is provided to produce an imaginary gear with the axis of rotation of the rotor corresponding to the axis of the imaginary gear and with the imaginary gear having a conical tooth surface represented by the cutting edges of the rotating cutter mounted on the rotor. When relative rotary motion is given to both axes at the relative position where the imaginary gear and a gear blank mesh with each other, the tooth space is cut and generated in the gear blank.

When cutting gears on this kind of gear cutting machine, the above mentioned imaginary gear is usually a crown gear or a close approximation thereof.

The number of teeth on the imaginary crown gear is usually not an integer, therefore, the crown gear and the bevel gear blank cannot be rotated continuously in mesh.

For the above reason, in the machine for cutting a spiral bevel gear using an imaginary crown gear, the rotor representing the imaginary gear and the gear blank cannot rotate continuously, but rather an intermittent oscillation is required, and another indexing mechanism should be added to cut all teeth on the gear blank. There are various types of gear cutting machines, but without exception every existing machine has required both a generating device and an indexing mechanism.

Compared with the above machines, the method of cutting gear teeth and the machine embodying this invention has superior characteristics in that it can be carried out by simple mechanism and is characterized in that generating motion and indexing motion can be produced by only a simple rotary motion and an imaginary gear and a gear blank are connected by a gear train through only one set of compound change gears which is adequate to both index and generate the gear blank whereas, in existing machines, two sets of compound change gears were provided for indexing and generating, respectively. The ratio of roll of an imaginary gear and a gear blank is kept a simple ratio and the number of teeth of the imaginary gear is selected in special relation to the number of teeth on the gear blank in order to secure the desired indexing motion during continuous rotation of the imaginary gear and gear blank.

For a better understanding of this invention, reference is to be had to the following detailed description which is to be read in connection with the accompanying drawings in which:

FIG. 6 is a perspective view of the main mechanisms provided in a gear cutting machine embodying the present invention;

FIG. 7 is a horizontal sectional view of the rotor of the gear cutting machine embodying this invention with a rotor position to represent an imaginary internal bevel gear, and of the pinion to be generated;

FIG. 7a is a tangent plane of pitch cone of the imaginary gear and the gear blank.

Figure 1:
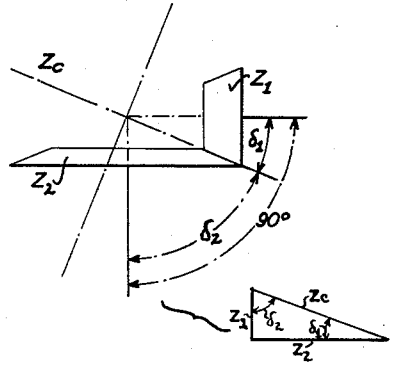
FIG. 1 illustrates the pitch angle of the bevel gears and the crown gear where a pair of bevel gears mesh at the shaft angle of 90°.

In accordance with the method of generating spiral bevel gears, the calculation of the number of teeth of the crown gear $Z_c$ adapted for use as an imaginary gear is carried out as follows:

In FIG. 1, where the numbers of teeth of a pair of spiral bevel gears meshing at 90° are $Z_1$ and $Z_2$ and their pitch angles are $\delta_1$ and $\delta_2$, respectively, $$Z_c = \frac{Z_1}{\sin \delta_1} = \frac{Z_2}{\sin \delta_2} \qquad (1)$$

Here,
$$\delta_1 = 90° - \delta_2' \quad \sin \delta_2 = \cos \delta_1'$$
$$Z_1 = Z_c \sin \delta_1 \quad Z_1{}^2 = \sin^2 \delta_1$$
$$Z_2 = Z_c \cos \delta_1 \quad Z_2{}^2 = \cos^2 \delta_1$$

Then $$Z_1{}^2 + Z_2{}^2 = Z_c{}^2(\sin^2\delta_1 + \cos^2\delta_1) = Z_c{}^2 Z_c{}^2 = Z_1{}^2 + Z_2{}^2 \quad (2)$$

accordingly $Z_c$ would not be an integer except in a few special cases.

As stated above a crown gear and a bevel gear in mesh, therefore, cannot generally rotate continuously.

The method of cutting curved teeth according to this invention uses, as the imaginary gear, a bevel gear having a special number of teeth with the pitch angle of the bevel gear being comparatively close to 90°, instead of using a crown gear, and this imaginary bevel gear and the gear blank to be cut rotate continuously in mesh. In order to make a tooth of the imaginary gear mesh one by one with another different new tooth of the gear blank, the special number of teeth of the imaginary gear is selected as follows:

$$nZ_c' = mZ \pm a \qquad (3)$$

where $m$, $n$, $a$, and $nZ_c'$ are all integers and $Z$ and $a$ are prime to one another,
$Z > a > 0$
$Z_c' < Z_c$
$Z_c'$ is taken as near $Z_c$ as possible,
$Z_c'$ equals the number of teeth on the imaginary gear,
$Z$ equals the number of teeth in the gear blank to be generated, and
$Z_c$ equals the number of teeth on a crown gear which can mesh with the gear blank to be generated.

When the imaginary gear having the number of teeth $Z_c'$ rotates in mesh with the gear having the number of teeth $Z$, $n$ turns of the imaginary gear correspond to $m$ turns, plus or minus one tooth, of the gear blank, and the numbers $Z$ and $a$ being prime to one another, then a new tooth space is cut into the gear blank during each $n$ revolution of the imaginary gear.

Thus, during continuous rotation of the imaginary gear and the gear blank, continuous indexing is performed automatically.

Referring now, by way of example, to the cutting of a pair of bevel gears with numbers of teeth $Z_1 = 15$ and $Z_2 = 31$, respectively, which mesh with their axes keeping an angle of 90°, and which have pitch angles of $\delta_1 = 25° 49'$ and $\delta_2 = 64° 11'$, then the number of teeth $Z_c$ is given by the Formula 1.

$$Z_c = \frac{15}{\sin 25° 49'} = \frac{31}{\sin 64° 11'} = 34.44$$

and $Z_c'$, the number of teeth of the imaginary gear, is given by the Formula 3 as follows:

$$nZ_c' = mZ_1 \pm a_1$$
$$1 \times 34 = (2 \times 15) + 4$$

here 15 and 4 are prime to one another, $$nZ_c' = mZ_2 \pm a_2$$
$$1 \times 34 = (1 \times 31) + 3$$

here 31 and 3 are prime to one another.

The selection of the parameters in the above formula are based on the required equality of $nZ_c'$ for the two gears and the prime relation between $Z_1$ and $A_1$ and $Z_2$ and $A_2$. $n$ must be an integer, and $n$ and $m$ are selected as desired, bearing in mind that for each $n$ revolutions of an imaginary gear the gear blank rotates $m$ revolutions plus or minus $a/Z$ and during this cycle one tooth space is cut on the gear blank. Those skilled in the art will clearly understand the selection of the parameters for the purpose of obtaining the desired number of teeth on the gear blank.

The tooth surface is generated one by one on the pinion blank when the imaginary gear of 34 teeth and the pinion of 15 teeth rotate continuously in mesh, and the tooth surface is generated one by one on the gear blank when the imaginary gear of 34 teeth and the gear of 31 teeth rotate continuously in mesh. Then the continuous indexing is produced by such rotating motion.

The characteristics of the tooth surface to be genereated will now be considered.

It is convenient that an imaginary gear be taken into account when the gear teeth are cut by a cutter moved relative to the gear blank, for example, when a spur gear having an involute profile is generated, a gear with any number of teeth is adopted as an imaginary gear, and the latter may be in the form of a rack having an infinite number of teeth or in the form of a pinion, without changing the nature of the tooth surface.

Accordingly, if teeth of a pinion blank are generated by an imaginary rack using a rack cutter and the teeth of a gear blank are generated by an imaginary pinion using a pinion cutter, these pinions and gears will mesh correctly, because the involute profile is an interchangeable tooth profile as is well known.

In the cutting of a spiral bevel gear, it is very convenient to use a face mill type annular cutter with straight side cutting edges in order to facilitate the attainment of high accuracy and productivity.

The conical surface created by the cutting motion of the straight side cutting edges of such a face mill type annular cutter is employed to define a tooth surface of the imaginary gear used in gear cutting.

The spiral bevel gear generated in such way, strictly speaking, does not have a theoretically interchangeable gear tooth profile. It is only handled presuming that, when a crown gear is used as an imaginary gear, an approximately interchangeable gear tooth profile can be obtained. Then if the bevel pinion is generated by an imaginary bevel gear having the number of teeth $Z_c'$ and the bevel gear is generated by an imaginary bevel gear having the number of teeth $Z_c''$, the generated pinion and gear cannot mesh correctly. But if we take an imaginary internal bevel gear with the number of teeth $Z_c'$ to generate the bevel pinion and an imaginary external bevel gear with the number of teeth $Z_c'$ to generate the bevel gear, and the pitch cone and tooth surface of the imaginary internal bevel gear coincide with the pitch cone and tooth surface of the imaginary external bevel gear when the two imaginary gears are brought face-to-face, the generated pinion and gear can mesh theoretically, even if the tooth profile is not an interchangeable tooth profile. This theoretic meshing results from the fact that the path of contact coincides perfectly in each case. This is a new method of cutting spiral bevel gears. This will be explained with reference to the cutting of spur gears as an example, as follows:

A pinion generated by an imaginary internal gear having a straight non-interchangeable profile will mesh with a gear generated by an imaginary external gear also having a straight non-interchangeable profile if the latter's pitch cylinder and tooth surface coincide perfectly with the pitch cylinder and tooth surface of the imaginary internal gear used for the pinion when an imaginary external gear is inserted into an imaginary internal gear.

Figure 2:
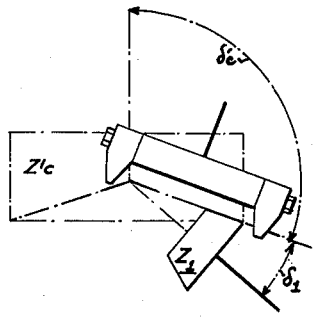
FIG. 2 illustrates how the gear cutting machine of the present invention generates a bevel pinion by an imaginary internal bevel gear.
Figure 3:
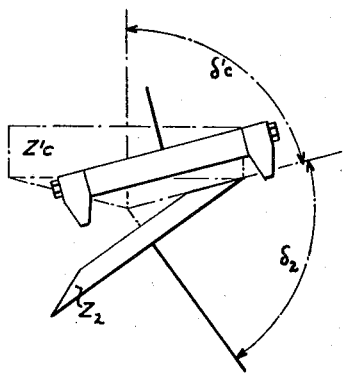
FIG. 3 illustrates how the gear cutting machine of the present invention generates a bevel gear by an imaginary external bevel gear.
Figure 4:
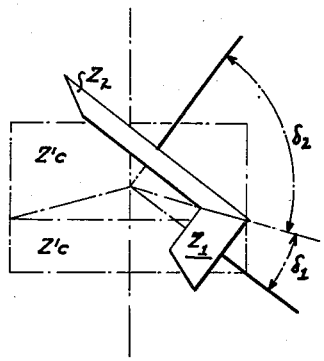
FIG. 4 illustrates how a spiral bevel pinion and a spiral bevel gear which are to be meshed with each other are individually generated by an internal bevel gear and an external bevel gear whose pitch cone and tooth surface coincide perfectly with those of the internal bevel gear when the internal and external bevel gears are brought into face-to-face relationship.

To apply the above principle to the cutting of bevel gears, it will be seen that the imaginary internal gear used to generate the pinion gears corresponds with the imaginary internal bevel gear having the number of teeth $Z_c'$ as shown in FIG. 2, while the imaginary external gear corresponds with an imaginary external bevel gear which coincides with the imaginary internal bevel gear when they are brought face-to-face. FIG. 4 shows that these imaginary internal and external bevel gears coincide perfectly.

The cutter installed on a rotor having an axis which coincides with the axis of the imaginary gear can embody various tooth surfaces of the imaginary internal bevel gear or external bevel gear, so that correct and convenient gear cutting operation can be performed.

Figure 5:
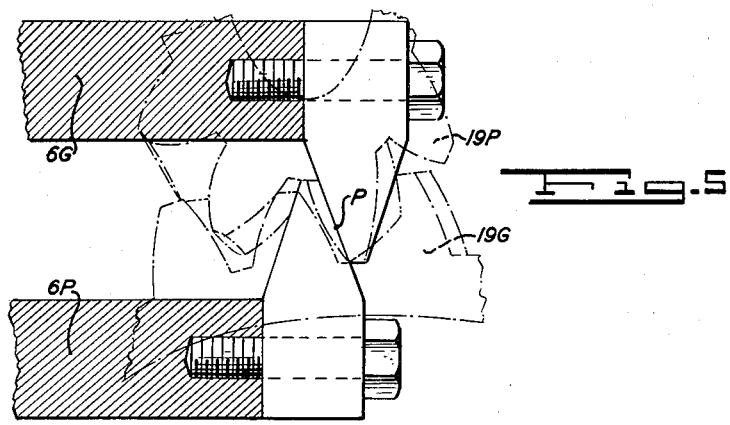
FIG. 5 is a sectional view illustrating the case in which a spiral bevel pinion and gear set are generated individually by a face mill type annular cutter with straight cutting edges which coincide with each other at the normal plane of lengthwise line of tooth.

Referring now to FIG. 5, it will be seen that two cutters, 6G and 6P, are there illustrated, with the cutter 6P generating a pinion 19P and the other cutter, 6G, generating a gear 19G on the plane normal to the lengthwise tangent line of the tooth surface of the pinion or gear to be cut.

FIG. 6 shows the main mechanism of a gear cutting machine embodying this invention. To determine a relative position where the gear blank 19 to be cut and the imaginary gear 7 employed to generate the tooth on the gear blank are in mesh correctly, the illustrated machine includes a work head 18, work head support 20, swing table 21 and slide table 22. The cutter 6 which defines one tooth of the imaginary gear, rotates on the rotor 4 and performs a cutting motion. The relation between the rotor and the cutter and the drive system of the cutter will be hereinafter explained.

The rotor 4 embodying the imaginary gear is driven by a worm 2 meshing with a worm wheel 3 and, on the other hand, a work spindle 17 holding the gear blank 19 is driven by a worm 15 meshing with a worm wheel 16.

The worm 2 associated with the rotor 4 and the worm 15 associated with the work spindle 17 are interconnected by bevel gears 9, 10, 11, 12, 13 and 14 through one set of compound change gears 8 for generation and index as shown in FIG. 6. Thus, the rotor 4 and the work spindle 17 may be made to rotate at the inverse ratio between the number of teeth $Z_c'$ of the imaginary gear and the number of teeth $Z_1$ or $Z_2$ of the gear blank.

The detailed construction of the rotor 4 will be explained with reference to FIGS. 7, 8 and 9.

Figure 8:
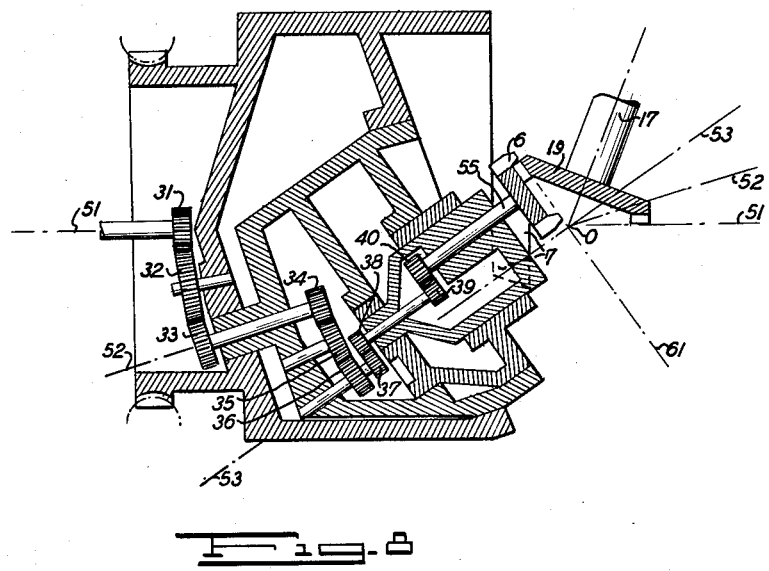
FIG. 8 is a horizontal sectional view similar to FIG. 7 but with the rotor of the gear cutting machine adjusted to represent an imaginary external bevel gear.
Figure 9:
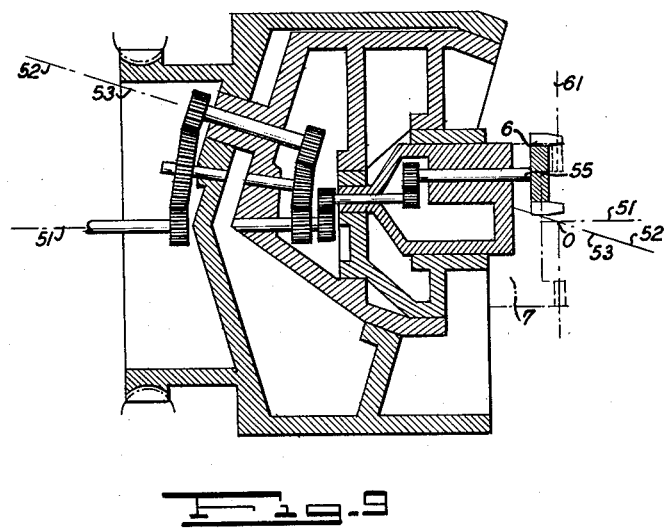
FIG. 9 is a horizontal sectional view of the rotor where the tilt angle of the cutter is reduced to zero degrees by adjusting the mechanism of the rotor of the gear cutting machine embodying this invention.

The cutter 6 on the rotor 4 must define the tooth surface of the imaginary gear 7 by its cutting motion and the imaginary gear is utilized either as an internal bevel gear, as shown in FIG. 7, or as an external bevel gear, as shown in FIG. 8. For these purposes the axis of the cutter 6 is tilted with respect to the axis of the rotor 4.

In previously known gear cutting machines of this kind, the position of the apex of the pitch cone of the imaginary gear is usually shifted when the axis of the cutter is tilted.

However, in the machine embodying this invention, the machine center is maintained at a constant position 0 which coincides with the apex of the imaginary gear, and the rotor 4 has a special arrangement for this purpose as is hereinafter described in detail with reference to FIGS. 7 and 8.

(1) A swash plate 41 with its axis 52 inclined relative to the axis 51 of the rotor 4 is rotatably fitted in the rotor 4 and is fixed by any suitable means (not shown) after rotational adjustment relative to the rotor.

(2) A swivel 42 with its axis 53 inclined relative to the axis 52 of swash plate 41 is rotatably fitted in the swash plate 41 and is fixed relative to the latter by any suitable means (not shown) after rotational adjustment.

(3) The axis 53 of the swivel 42 is parallel to the axis of the spindle 55 carrying the cutter 6, and is offset with respect to the latter.

In the above described construction, rotational adjustment of the swash plate 41 and the swivel 42 can effect tilting of the cutter spindle 55 in the directions as shown in FIGS. 7 and 8. Moreover, the axis of the cutter spindle 55 can be fixed at any tilt angle between the maximum tilt angle as shown in FIGS. 7 and 8 and zero as shown in FIG. 9. The apex 0 of the pitch cone of the imaginary gear which coincides with the point of intersection of the axes 51 and 52 of the rotor and swash plate, respectively, always remaining at a constant position without any movement even while the swash plate 41 and the swivel 42 are adjusted by turning.

In order to give the imaginary gear any desired spiral angle and cone distance, it is necessary to shift the cutter 6 toward or away from the machine center 0 in the tilted plane 62 which is perpendicular to the axis of the cutter spindle 55 and also tangent to the pitch cone of the gear blank 19.

In FIG. 7a the plane 62 including the pitch generating line 61 has been illustrated.

Where it is desired that one of the teeth on the imaginary gear represented by the cutter will be made to form a desired spiral angle $\beta$ (FIG. 7a) at the cone distance $Rcm$ on the plane 62, the cutter spindle 55 is moved to proper position for that purpose.

In order to permit such movement of the cutter in the plane 62, an eccentric cylinder 43 is fitted in swivel 42 to turn relative to the latter about an axis, parallel with the axis 53, and is adapted to be fixed by any suitable means in any position after rotational adjustment. The cutter spindle 55 is mounted in the eccentric cylinder 43 with the axis of the spindle 55 being parallel to and offset from the axis of the eccentric cylinder.

Thus, the location of the cutter spindle can be set after rotational adjustment of the swivel 42 and the eccentric cylinder 43. Since the axes of the rotor 4, swash plate 41 and swivel 42 intersect at one point 0, which is the apex of the imaginary gear, the position of that apex is never changed by the rotational adjustment so that setting of the machine is greatly simplified.

The cutter 6 revolves as a planet upon rotation of the rotor 4 about its axis 51.

The above described gear cutting machine is also applicable to the manufacture of hypoid gears and other gears having similar curved teeth.

The above description of the invention has relation to the generation of theoretically correct teeth, but lengthwise crowning and slight easing on the addendum or deredendum are necessary for practical use, and can be attained in the gear cutting machine of the present invention by a slight change in the machine setting and the cutter.

What is claimed is:

1. In a gear cutting machine, the combination of a machine frame, a rotor mounted in said frame for rotation about a first axis, said rotor having an opening with an axis intersecting said first axis and being inclined relative to said first axis by a predetermined angle, a swash plate supported in said opening of the rotor for angular adjustment relative to the rotor about said axis of the opening, said swash plate having an opening with an axis intersecting said axis of the opening of said rotor at the point of intersection thereof with said first axis and being inclined with respect to said first axis at an angle equal to said predetermined angle, a swivel supported in said opening of the swash plate for angular adjustment relative to the swash plate and having an opening with an extending axis parallel to, and offset radially from, said axis of the opening of the swash plate, an eccentric cylinder supported in said opening of the swivel for angular adjustment with respect to the swivel about said axis of the opening in the swivel, a spindle rotatably supported in said eccentric cylinder with the axis of said spindle being parallel to, and offset radially from, said axis of the opening in the swivel, a face mill type annular cutter on said spindle to define a tooth of an imaginary bevel gear having a pitch cone with the apex of the latter permanently located at the point of intersection of said first axis and of the axes of said openings in the rotor and swash plate, respectively, which point defines a fixed machine center, even as the axis of said spindle is tilted relative to said first axis and shifted relative to said machine center by rotational adjustment of said swash plate, swivel and eccentric cylinder, and continuously engaged driving means for rotating said spindle as the latter is tilted and shifted with respect to said first axis and said machine center, respectively.

2. In a gear cutting machine, the combination as claimed in claim 1, wherein said driving means includes a rotated drive gear coaxial with said first axis, a driven gear on said spindle, and a gear train between said drive gear and driven gear including gears which are rotatable about said axes of the openings of the rotor, swash plate and swivel, respectively, to maintain said gear train in engaged relation during rotational adjustment of said swash plate, swivel and eccentric cylinder.

References Cited in the file of this patent

UNITED STATES PATENTS

| | | | |
|---|---|---|---|
| 1,349,951 | Gleason et al. | Aug. 17, | 1920 |
| 1,555,530 | Trbojewick | Sept. 29, | 1925 |
| 1,969,843 | Head | Aug. 14, | 1934 |
| 2,508,556 | Wildhaber | May 23, | 1950 |
| 2,667,818 | Stewart et al. | Feb. 2, | 1954 |
| 2,725,792 | Wildhaber | Dec. 6, | 1955 |
| 2,783,686 | Ciallie et al. | Mar. 5, | 1957 |
| 2,792,764 | Carlsen et al. | May 21, | 1957 |
| 2,947,223 | Carlsen et al. | Aug. 2, | 1960 |
| 2,949,062 | Apitz | Aug. 16, | 1960 |

FOREIGN PATENTS

| | | | |
|---|---|---|---|
| 319,173 | Germany | Feb. 27, | 1920 |